Feb. 12, 1963  O. ADAMS ETAL  3,077,082
LIQUEFACTION OF HYDROGEN CHLORIDE
Filed Sept. 4, 1958
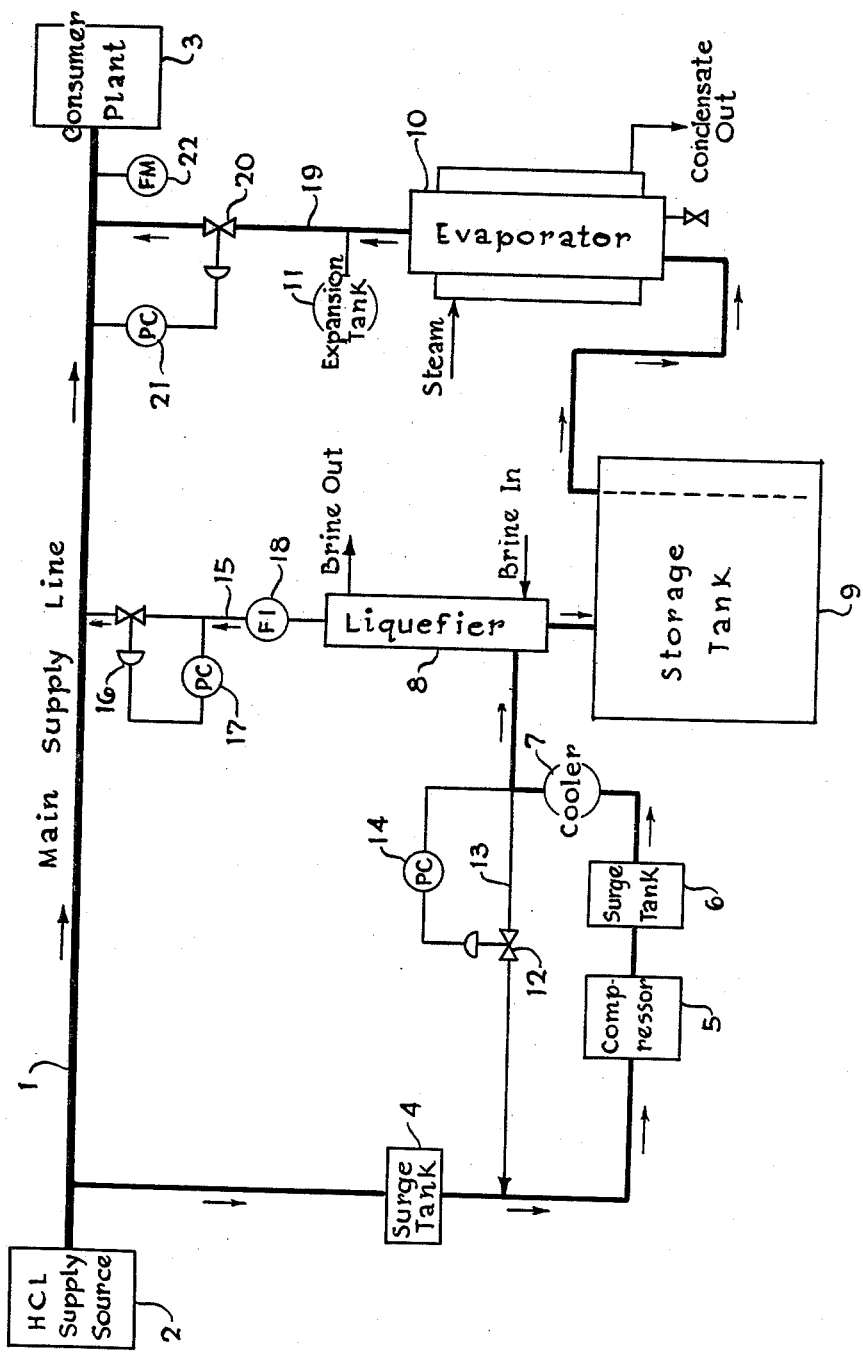

3,077,082
LIQUEFACTION OF HYDROGEN CHLORIDE
Omar Adams and Ralph Simonette, Niagara Falls, and Joseph M. Hildyard, Youngstown, N.Y., assignors to Hooker Chemical Corporation, Niagara Falls, N.Y., a corporation of New York
Filed Sept. 4, 1958, Ser. No. 759,036
3 Claims. (Cl. 62—45)

This invention relates to a gas supply system containing a standby or reserve gas reservoir.

The present invention resides in a system for supplying hydrogen chloride gas to some point of use including the liquefaction of pure or contaminated hydrogen chloride gas and the storage of hydrogen chloride liquid. More particularly this invention resides in a method and apparatus for liquefying hydrogen chloride gas and storing the liquefied gas so as to provide a supply of liquefied gas which may be used directly as a liquid reagent, transported as a liquid for use elsewhere, or vaporized for supply to a main gas supply line.

In the manufacture, liquefaction and transportation of a liquefied gas, many difficulties occur. These difficulties become more complicated and involved when the manufacture, liquefaction and transportation together are included in the same system. Such is the situation when one has a gas supply source, a gas supply line, and a gas consumer, one interdependent upon the other. In one specific situation, hydrogen chloride gas is manufactured and immediately fed to a gas supply line where the gas is transported to the user on a metered system. It is extremely desirable to have a standby or reserve supply in the system in the event that the main source of the manufactured gas is impaired in any way. We have accomplished this reserve by the liquefaction of gaseous hydrogen chloride, storage of this liquid in the system, and evaporating this liquid when it is desired. This standby supply is of great significance since without it an interruption in the main source will result in a discontinuance or interruption of plant operations in the consumer's plant. This standby supply is of further significance in that the producer of the gas is enabled to shut down his producing units for repair and maintenance without interrupting the supply of gas to the consumer. This standby supply is of still further significance because the producer of the gas is enabled to produce liquid and gas practically chemically pure.

This liquefaction process was not accomplished without complications. It was a serious problem to liquefy contaminated gases and avoid the formation of explosive conditions with the non-condensable gases included in the hydrogen chloride supply. A further problem was to liquefy under specific conditions, such that hydrogen chloride hydrate would not form on the condensing surfaces. Applicants' supply system was designed in such a manner that these difficulties were overcome and a commercial, feasible, efficient process resulted.

In carrying out the present invention, hydrogen chloride at a reduced pressure (for example 0 to about 30 p.s.i.g.) is compressed to sufficient pressure such that liquefaction will occur at the selected temperature of the cooling medium or above. Depending upon the moisture content of the compressed gas, hydrogen chloride hydrate may be solidified out of the gas stream at temperatures below $-17.7$ degrees centigrade. Hydrate formation can result in impaired condensing surfaces, thereby resulting in poor liquefaction efficiencies. With suitably designed equipment, we have found that the formation of hydrate will not be a problem in the process, but will be continuously removed by the liquefied hydrogen chloride. However, it is still possible to operate this process even if hydrate formation should occur. In this case the hydrogen chloride is compressed to sufficient pressure such that liquefaction will occur above the freezing point of hydrogen chloride hydrate. This pressure is influenced by the percentage of non-condensables in the gas. A typical pressure is 228 p.s.i.a. for essentially 100 percent hydrogen chloride. Hydrate formation occurs at $-17.7$ degrees centigrade at which temperature hydrogen chloride has a pressure of 228 p.s.i.a. Another typical pressure is 241 p.s.i.a. or above when 5 percent non-condensables are present and liquefaction occurs at $-17.7$ degrees centigrade. The problem of hazardous non-condensables is solved by liquefying at a higher pressure and somewhat warmer condensing temperatures such that it is necessary to vent a portion of the hydrogen chloride with the non-condensables to permit further liquefaction. The liquefaction temperature and pressure are selected so that the hydrogen chloride that must be vented keeps the non-condensables below their lower explosive limit. Non-condensables may consist of hydrogen, chlorine, oxygen, nitrogen, and other gases.

In order that the invention be more easily understood, it will be described with reference to the attached drawing.

The drawing shows a hydrogen chloride supply system having the combination of a source of hydrogen chloride 2, a main hydrogen chloride supply line 1, and a hydrogen chloride reservoir, said reservoir comprising a gas receiving vessel (or surge tank) 4 positioned off said main supply line and connected on one end thereto, a gas compressor 5 in contact with said gas receiving vessel and adapted to receive and compress the surplus gas drawn from the supply line, an accumulator vessel (or surge tank) 6 in contact with said compressor, a gas cooler 7, a gas liquefier 8 in spaced relationship with said cooler and a liquid storage tank 9 adjacent and immediately below or in spaced relationship to said gas liquefier and adapted to receive the liquid hydrogen chloride, an evaporator 10 connected to the liquid storage tank 9 on one end and the main supply line 1 on the other, said evaporator 10 adapted to draw liquefied hydrogen chloride from said liquid storage tank 9 and pass said gas product back to said main supply line.

Purified hydrogen chloride gas is taken from the hydrogen chloride main supply line 1 at a point between the hydrogen chloride source 2 and the consumer 3 at a low pressure, for example 0 to 30 p.s.i.g. (pounds per square inch gauge). One preferred embodiment uses 30 p.s.i.g. The gas is usually drawn off the main supply line 1 during periods of excess production, however this gas can be drawn off the main supply line at the will of the operator. The gas then passes through surge tank 4. This tank 4 is used to minimize pulsations in the hydrogen chloride gas flow and to prevent starvation of the compressor 5. Drain connections not shown in the drawing are provided for the surge tank to draw off any material which collects therein. It is, of course, optional to use surge tanks in the system; it is preferred, however, as mentioned above that the same be used to minimize pulsations in the gas flow and to prevent starvation of the compressor. We have found that a steel tank was satisfactory, however, any suitable material may be used. From the surge tank 4 the hydrogen chloride gas passes to compressor 5 where it is compressed to any desired high pressure, for example, we use in our preferred embodiment up to 300 p.s.i.g. Pressures above 300 p.s.i.g. up to the critical pressure may also be used with an increase in the temperature requirements of the refrigerant to the point where water or air cooling is satisfactory for liquefaction. Liquefaction can also be done at pressures below 300 p.s.i.g. down to the triple point below atmospheric pressure with a corresponding decrease in the condensing temperature. In our process one of the compressors found to be most suitable was a single-stage, double-acting compressor. It has a capacity of 61.4 c.f.m. at 30 p.s.i.g. and 90 degrees Fahrenheit suction conditions. The temperature and pressure of the gas entering the compressor can be measured by any suitable temperature and pressure indicating device. We used a water-cooled compressor cylinder; however, any standard cooling means may be utilized. The compressor 5 discharges into surge tank 6. Again it is not critical to the invention that a surge tank be used here; however, for best results we preferred to use such a tank. From the surge tank 6 the compressed hydrogen chloride gas flows to a shell and tube heat exchanger, hydrogen chloride gas cooler 7, where it is cooled by water or other desired coolant as the gas passes through the exchanger. Any suitable cooler may be employed; however, we preferred an all steel heat exchanger of fixed tube sheet design with a large tube surface. The unit was designed to cool 1100 pounds of anhydrous hydrogen chloride per hour from 450 degrees Fahrenheit to 90 degrees Fahrenheit but may be sized for any desired conditions. An air-operated control valve (not shown in the drawing) was used which opened or closed to admit or shut off cooling water in the hydrogen chloride gas cooler 7. The water used in the cooler discharges from the hydrogen gas cooler 7 and flows freely to a funnel on a sewer inlet. This water can be tested for hydrochloric acid periodically to determine whether or not a gas leak has developed in the hydrogen chloride gas cooler. In the hydrogen chloride line leaving the hydrogen chloride gas cooler 7 there is a bypass connection 13 back to the suction side of the hydrogen chloride compressor 5. If more hydrogen chloride gas is compressed than is liquefied, the pressure will build up. A pressure impulse connection transmits this pressure to a pressure control device 14 which is set to open pressure control spill-over valve 12, located in line 13. Pressure control device 14, line 13 and valve 12 operate together to bypass the excess capacity of the compressor back to the compressor suction line. Other means of relating the capacity of the compressor to the desired liquefaction rate may be devised however. The hydrogen chloride gas that is not bypassed flows from the hydrogen chloride gas cooler 7 up through the tube liquefier 8, where it is cooled and condensed to liquid hydrogen chloride by a suitable refrigerant. We used refrigerated brine for economy and convenience; however, any suitable medium may be used. We used a vertical, shell and tube, all steel heat exchanger of fixed tube sheet design with 398 square feet of tube surface. The shell and tube sides were both single pass with the hydrogen chloride inside the tubes; the refrigerated $CaCl_2$ brine was in the shell. The unit was designed to cool, liquefy and sub-cool 1100 pounds per hour of anhydrous hydrogen chloride gas from 90 degrees Fahrenheit to 5 degrees Fahrenheit with refrigerated brine in at 0 degrees Fahrenheit and out at 5 degrees Fahrenheit, but may be sized for any desired conditions. The liquefier 8 also acts as a reflux condenser to maintain the temperature of the liquefied hydrogen chloride below 5 degrees Fahrenheit when the liquid storage tank 9 is on standby service. The brine or cooling medium was designed to flow through the liquefier at all times. The cooling medium may be supplied in any convenient manner. The rate of feed of hydrogen chloride gas to the liquefier may be controlled by any convenient manner, applicants used a flow valve (not shown in the drawing). The flow rate is determined by the amount of gas vented and the desired rate of liquefaction. The temperature of the exit brine from the liquefier may be indicated by a temperature gauge suitably mounted. The liquid hydrogen chloride falls from the liquefier to the liquid hydrogen chloride storage tank 9. A mixture of hydrogen chloride gas and non-condensable gases is vented back to the hydrogen chloride main supply line 1 through vent line 15 but may be vented to other places if desired. For example, these gases may be vented out of the system and completely disposed of. This gas mixture is vented to prevent accumulation of non-condensables in the system. It is important that these non-condensables be vented out of the liquefier for two reasons: firstly, to prevent the cessation of the liquefaction process because of gas blanketing of the condensing surfaces and, secondly, to prevent the formation of explosive mixtures in the system. The vent line 15 is provided with a control valve 16 that may be actuated either manually or by pressure controller 17 to control the back pressure on the hydrogen chloride storage tank 9. There is a flow indicator 18 also in vent line 15.

The formation of expoxive mixtures within the storage tank 9 and the liquefier 8 is most easily prevented by venting enough gaseous hydrogen chloride with the non-condensables so that the percentage of non-condensables in the vent gas is kept below the lower explosive limit of any possible explosive combination. Also certain conditions may be devised to operate above the higher explosive limits. The temperature-vapor pressure relationship of the hydrogen chloride liquid-gas system is such that for any existing operating pressure the condensing temperature or dew-point of any vent gas of a desired concentration can be determined by calculations and by analysis or vice-versa. One may use an inert gas as an additive to the hydrogen chloride feed gas if desired, thus reducing the quantity of hydrogen chloride gas that must be vented. Such an expedient would be useful to prevent the formation of explosive mixtures in the system and increase the percentage of the hydrogen chloride gas liquefied.

In practice, the control of non-condensables was accomplished in two ways. The first method was to relate the exit temperature of the vent gas to the pressure required to give the desired percentage of non-condensables in the vent. This pressure was then used as the set point of the back pressure controller 17. In the second method, the feed rate of hydrogen chloride gas to the liquefier and the percentage non-condensables in the feed gas was determined. The vent valve 16 was manually set to provide a sufficient vent rate so that the non-condensables in the vent were kept below the lower explosive limit.

Other methods of controlling the vent may be devised for instance, a gas analysis controller could be installed in the vent stream to keep the non-condensables within the required operating limits. Also it is not required that the non-condensables be returned to the main supply line, but they can be vented elsewhere, for example to a disposal unit not open to the supply system.

The storage tank 9 receives the liquefied hydrogen chloride immediately upon formation of the liquid. We preferred to use a storage tank of all steel construction with a capacity large enough to supply hydrogen chloride to the consumer for approximately one-quarter to one day. However, the choice of design or capacity of the storage tank to be used is a matter of one's specific needs. Our tank was equipped with a vent line to disposal and a well line for discharge of the liquid. A load cell was used to measure the weight of the liquid in the tank. Also, it is preferred to use a liquid level alarm to convey to the operator when the liquid is at certain levels. Evaporator 10 has a discharge line 19 through which vaporized hydrogen chloride is readmitted to the main supply line 1. In line 19 is a control valve 20 operated by pressure controller 21 which has as its measuring impulse the pressure existing within supply line 1. If the pressure in supply line 1 drops below the set point of controller 21, valve 20 opens to permit the flow of gas from the evaporator to the supply line. This reduces the gas pressure within evaporator 10 and liquefied hydrogen chloride flows from storage tank 9 to the vertical steam jacketed evaporator 10. Here the liquefied hydrogen chloride is vaporized to provide a continuing supply for conveyance. Steam is on the jacket of the evaporator at all times, even when no liquefied hydrogen chloride is being evaporated. Our preferred evaporator has a capacity to evaporate 5000 pounds per hour of liquefied hydrogen chloride when heated by 30 p.s.i.g. steam, but may be sized for any desired rate. The evaporator was also equipped with a bottom drain valve for removing materials. Pressure, temperature and flow indicating means on the evaporator may be used to adjust conditions to one's requirements. Expansion chamber 11 may be used to provide space for the expansion of liquefied hydrogen chloride which may be entrapped in lines and equipment between the main supply line 1 and the evaporator 10. Meter 22 records the amount of gas received by the consumer plant.

From the foregoing, it is obvious that we have provided a useful, novel hydrogen chloride liquefaction and supply system, one that will continue to provide a constant supply of a fixed purity hydrogen chloride irrespective of the fluctuations and difficulties in the main supply source.

Although some specific examples of the various types of apparatus and equipment used in our system have been given, it will be understood that this was done only to illustrate the invention. Various modifications and ramifications can be made in the process and equipment discussed above, designed to adapt said system for use with hydrogen chloride or other gases or gas mixtures. These modifications will be apparent to anyone skilled in the art upon reading the basic invention disclosed herein. These are intended to be comprehended with the spirit of this invention.

We claim:

1. In a system for storing and supplying substantially anhydrous hydrogen chloride gas, the method which comprises: withdrawing gaseous substantially anhydrous hydrogen chloride from main supply line means into a reserve anhydrous hydrogen chloride storage means having gas compressor means having inlet means in communication with said main supply line means, heat exchanger means having outlet means in substantially direct communication with said inlet means of said compressor means through pressure-controlled bypass means, liquefier means having pressure-controlled vent gas means, storage tank means, and evaporator means having pressure-controlled outlet means in communication with said main supply line means, compressing said gas to a pressure of at least about 228 p.s.i. absolute in said compressor means, cooling the compressed gas by passing it through said heat exchanger means, passing the cooled compressed gas to the said liquefier means for liquefaction while bypassing excess hydrogen chloride gas to the inlet side of said compressor means through the said pressure-controlled bypass means, liquefying the compressed gas at a temperature between about 90 degrees Fahrenheit and about zero degrees Fahrenheit in the said liquefier means, while venting gases which will not condense at the operating conditions of the liquefier through the said pressure-controlled vent-gas means, collecting and storing the liquefied hydrogen chloride in said storage tank means, and withdrawing and evaporating off liquefied hydrogen chloride and returning it to said main supply line means through said pressure-controlled outlet means as it is needed.

2. The method of claim 1 wherein the said vent gases are passed to the said main supply line means.

3. In a system for storing and supplying substantially anhydrous hydrogen chloride gas, the method which comprises: withdrawing gaseous substantially anhydrous hydrogen chloride from main supply line means into a reserve anhydrous hydrogen chloride storage means having gas compressor means having inlet means in communication with said main supply line means, water-cooled heat exchanger means having outlet means in substantially direct communication with said inlet means of said compressor means through pressure-controlled bypass means, brine-cooled liquefier means having pressure-controlled vent gas means in communication with the said main supply line means, storage and tank means, and evaporator means having pressure-controlled outlet means in communication with said main supply line means, compressing said gas to a pressure of at least about 228 p.s.i. absolute in said compressor means, cooling the compressed gas by passing it through said water-cooled heat exchanger means, passing the cooled compressed gas to the said liquefier means for liquefaction while bypassing excess hydrogen chloride gas to the inlet side of said compressor means through the said pressure-controlled bypass means, liquefying the compressed gas at a temperature between about 90 degrees Fahrenheit and about zero degrees Fahrenheit in the said brine-cooled liquefier means, while venting gases which will not condense at the operating conditions of the liquefier to the main supply line through the said pressure-controlled vent-gas means, collecting and storing the liquefied hydrogen chloride in said storage tank means, and withdrawing and evaporating off liquefied hydrogen chloride and returning it to said main supply line means through said pressure-controlled outlet means as it is needed.

References Cited in the file of this patent

UNITED STATES PATENTS

| | | |
|---|---|---|
| 1,266,621 | Peterson | May 21, 1918 |
| 2,082,189 | Twomey | June 1, 1937 |
| 2,090,163 | Twomey | Aug. 17, 1937 |
| 2,437,290 | Bottenberg et al. | Mar. 9, 1948 |
| 2,535,148 | Martin | Dec. 26, 1950 |
| 2,951,347 | Spangler et al. | Sept. 6, 1960 |